United States Patent [19]

Hoppe et al.

[11] Patent Number: 5,433,866
[45] Date of Patent: Jul. 18, 1995

[54] SYSTEM AND METHOD FOR TREATING WATER

[76] Inventors: Jeffrey E. Hoppe; Gerald O. Watkins, both of 5994 Broadmoor Dr., La Mesa, Calif. 91942

[21] Appl. No.: 210,706

[22] Filed: Mar. 18, 1994

Related U.S. Application Data

[63] Continuation-in-part of Ser. No. 898,296, Jun. 15, 1992, abandoned.

[51] Int. Cl.$^6$ ............................ C02F 1/32; C02F 1/78
[52] U.S. Cl. ........................................ 210/748; 20/760
[58] Field of Search ................................ 210/760, 748

[56] References Cited

U.S. PATENT DOCUMENTS

| | | | |
|---|---|---|---|
| 4,029,578 | 6/1977 | Turk | 210/760 |
| 4,250,040 | 2/1981 | LaRaus | 210/760 |
| 4,256,574 | 3/1981 | Bhargava | 210/760 |
| 4,978,508 | 12/1990 | Hansen et al. | 204/158.2 |
| 5,077,007 | 12/1991 | Pearson | 210/760 |

*Primary Examiner*—Neil McCarthy
*Attorney, Agent, or Firm*—Loyal M. Hanson

[57] ABSTRACT

A method for treating wastewater and for purifying and disinfecting drinking water. The treatment includes the addition of pressurized ozonated air to the pumped raw water stream by use of a venturi injector and then achieving well-mixed ozonated water by an in-line static mixer. This promotes the ozone reaction with pollutants in the raw water. The stream is then injected into the ultraviolet (UV) reaction chamber by a static impinger in the form of a conical spray nozzle. This breaks up the stream into a fine mist of one-micron diameter droplets falling down through the chamber. Air released from the droplets is suitably vented to keep the chamber pressure near atmospheric. At a lower plane in the chamber, a UV light source in the form of a uniform grid of essentially coplanar UV lamps irradiates the falling droplets to kill bacteria and viruses and also to catalyze the still ongoing ozone reaction. In the bottom of the chamber, the now treated water forms a pool which is pumped out through filters to its final point of use.

A low residence time of two minutes results from optimum process criteria and chamber geometry. The former include a 20:1 mixture ratio of raw water to ozonated air in the inflow and a pressure of several atmospheres going into the spray nozzle. The latter include a conical chamber roof to facilitate proper droplet motion, the specified placement of the UV light source in a horizontal plane, and a curved chamber bottom to keep any particulates in suspension and enhance drainage of the treated water.

7 Claims, 3 Drawing Sheets

SYSTEM AND METHOD FOR TREATING WATER

CROSS-REFERENCE TO RELATED APPLICATIONS

This application is a continuation in part of the United States patent application naming the same inventors that was filed Jun. 15, 1992 and assigned Ser. No. 07/898,296, now abandoned.

BACKGROUND OF THE INVENTION

1. Technical Field

This invention relates generally to water treatment, and more particularly to a system and related methodology for treating wastewater and the like with ozone and ultraviolet light for purification and disinfection purposes.

2. Background Information

Recall that some water treatment systems bleach or oxidize an effluent such as wastewater using ozone and ultraviolet (UV) light. They do so in the process of purifying and disinfecting the water. Ozone in the water acts directly to kill bacteria and viruses and to oxidize undesirable compounds in the water. UV light also acts directly to kill bacteria and viruses. In addition, it serves as a catalyst for the disinfecting and oxidizing action of the ozone. So some water treatment systems combine both ozone and UV light processing.

However, sufficient UV light absorbency is necessary to maximize ozone reactivity and enhance chemical breakdown within the effluent stream. It is difficult to achieve with large flow rates. In addition, the complexity, expense, and potential hazards of adapting existing techniques to a system capable of processing large volumes of water can be prohibitive.

U.S. Pat. No. 4,865,749 suggests passing ozone bubbles through the water and running the ozonated water past an ultraviolet lamp. One problem with that technique is that only limited water surface area is contacted by the ozone bubbles. But another problem is that of insufficient UV light absorbency. Water volume, color, and turbidity impede UV light absorbency, and running the ozonated water past an ultraviolet lamp as suggested results in too much water volume, color and turbidity for effective UV light absorbency.

U.S. Pat. No. 4,273,660 uses a nozzle to inject the water into a UV chamber in an attempt to improve absorbency. The water swirls in a spiral path around a centrally located UV lamp. But water volume and flow rate still impede the process. U.S. Pat. No. 4,230,571 also spirals water around a UV lamp with the same drawback.

The residence time of the water to be treated in the UV chamber is a measure of the effectiveness of the process. Long residence times, up to 45 minutes, are required in some existing systems to achieve adequate water purification and disinfection. An improved system and methodology for ozone and UV light processing is needed with a reduced residence time. For a given throughput, reduced residence time results in a smaller treatment system, with associated lower capital and operating costs.

SUMMARY OF THE INVENTION

The ozone and UV processing system of the present invention is designed to operate with a reaction chamber residence time of only two minutes. The system components and process parameters to achieve this will now be briefly described.

The wastewater to be treated, or "raw" water, is furnished at a pressure in the range from 30 to 160 pounds per square inch gauge (psig) from a pump to the liquid inlet side of a venturi injector having no moving parts. The throat of the venturi is connected to a pressurized source of ozonated air with ozone content in the range from 1 to 5 volume percent (v/o) at a pressure in the range from 15 to 25 psig. The venturi injector is designed to produce at its outlet an ozonated raw water stream with approximately one volume of ozonated air to twenty volumes of raw water at a pressure in the range from 15 to 80 psig.

In this stream the ozone is already reacting with the raw water to remove impurities. To promote intimate ozone/raw water mixing for maximum reactivity, the stream is ducted through a static mixer containing a multiplicity of curved vanes. In particular, the static mixer counteracts the tendency to "channel" in a flow of a gas/liquid mixture. Channeling is the term used to describe the parallel but unmixed flow of gas and liquid in a pipe due to the large difference in density between liquids and gases.

Aft of the static mixer, the now well-mixed ozonated raw water is injected as a fine mist of droplets by a misting component, such as a conical spray nozzle of the "pigtail" type used in the corn syrup industry, into the UV reaction chamber. The roof of the reaction chamber is conical in shape, enveloping the cone of the spray from the nozzle. Thus, any waste space in the upper reaction chamber is avoided and the smooth downward movement of the droplets is facilitated.

The spray nozzle dissipates the remaining pressure in the ozonated water flow (typically in the range from 13 to 78 psig) to produce droplets of one micron diameter which corresponds to a contact area of 12 million square feet for all droplets resulting from a gallon of water. The central and lower part of the reaction chamber accommodate the falling droplets from which ozonated air is released. A vent for the ozonated air is controlled to maintain close to atmospheric pressure in the reaction chamber, from zero to five psig.

In the lower part of the chamber, the falling droplets are irradiated by a battery of UV lamps emitting radiating at a wavelength of 254 nanometers (nm). For close to uniform irradiation of all droplets, a regular grid of tubular lamps in the horizontal plane has been found to give superior results. The lamps are encased in thin-walled quartz sleeves of approximately 1.25 inch outer diameter.

The very large surface-are-to-volume ratio of the droplets exposes an extremely high surface area to the ozonated air escaping from the ozonated water into the chamber as the mist is formed. Furthermore, it promotes UV absorbency as the droplets fall downwardly through the UV reactive zone in the lower region of the chamber by presenting individual droplets of less volume, color, and turbidity for the UV light to penetrate.

The greater ozone breakdown and increased efficiency of the chemical catalytic reaction makes possible the two-minute residence time in the reaction chamber. Thus, large flow rates can be accommodated in small treatment systems. The potential hazards of a highly pressurized reaction chamber are avoided by the provision of the venting system which produces close to atmospheric pressure in the chamber.

The reacted droplets fall to the curved bottom of the reaction chamber to form a pool of treated water. The curvature of the bottom aids in draining all liquid from the system, and if any particulates have been formed, they are more easily kept suspended in the water and so removed. In contrast, particulates are difficult to dislodge from a bottom with corners.

With the two-minute residence time, a 50-gallon pool of treated water can accommodate a 25 gallon per minute (gpm) throughput. The volume of the entire reaction chamber, allowing for the conical spray, droplet descent space, and UV reactive zone, is then of the order of 100 gallons.

The treated water is pumped out of the bottom pool through filters to its ultimate destination. The vented ozonated air is passed through a scrubber in which the residual ozone is reacted to oxygen before discharge to the atmosphere.

The ozone-UV wastewater treatment system described above operates efficiently with a two-minute residence time with the stated design criteria and process parameters. Because the ozonated raw water supply runs at modest pressures and the reaction chamber operates essentially at atmospheric pressure, the entire treatment system can be fabricated from commercially available components.

The following illustrative drawings and detailed description make the objects, features, and advantages of the invention more apparent.

DESCRIPTION OF THE PREFERRED EMBODIMENTS

Figure 1:
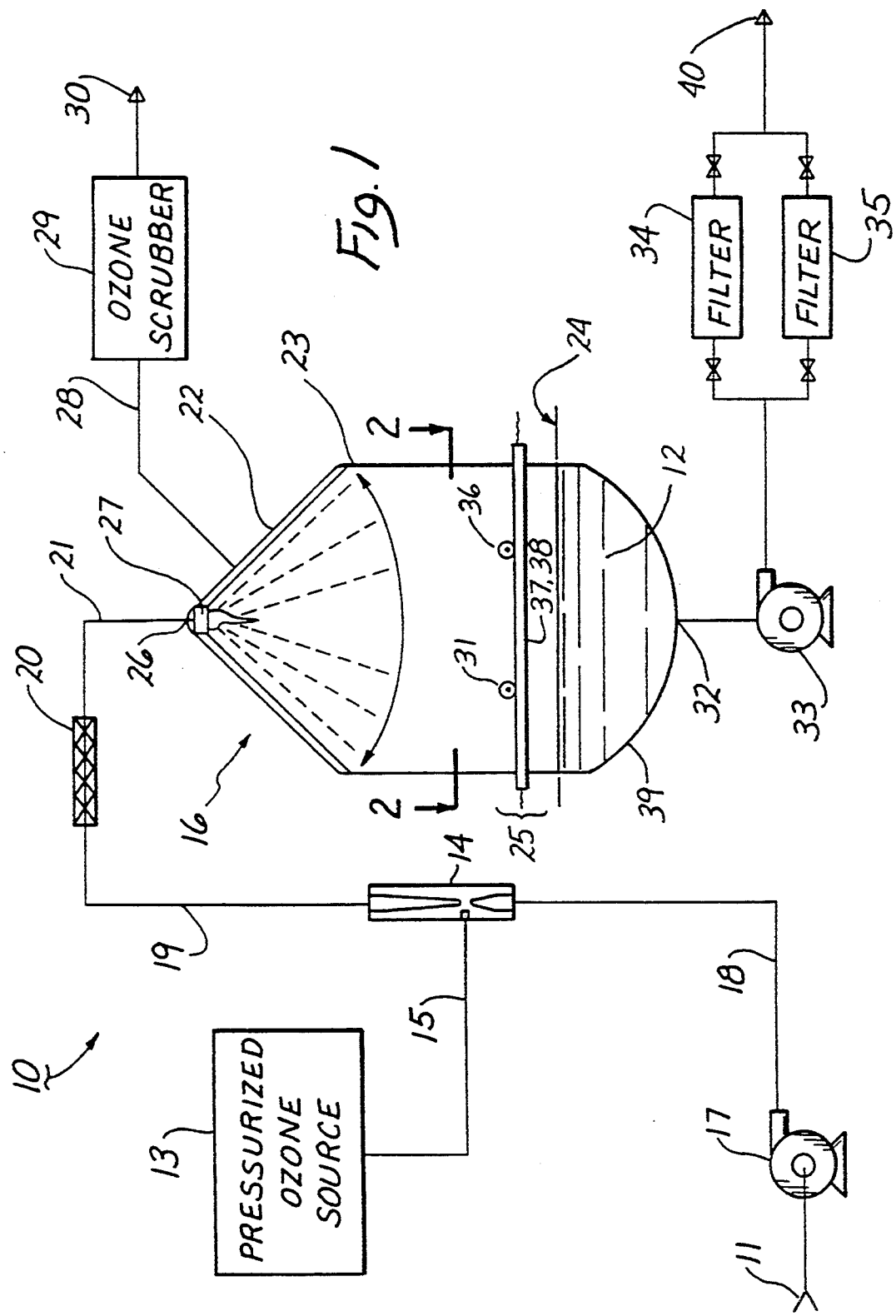
FIG. 1 of the drawings is a system for treating water with ozone and UV light that is constructed according to the invention.

FIG. 1 of the drawings shows a system 10 constructed according to the invention. Generally, it includes an inlet 11 at which to receive water to be treated, an outlet 40 at which to discharge the water after it has been treated, and a combination of water treatment components that form a passage for the water between the inlet and the outlet. Those elements may be implemented with commercially available components subsequently identified and they combine to achieve effective ozone and UV light water treatment.

The combination of components employed include an ozone-producing component 13 for producing what will be referred to as ozonated air (i.e., a gaseous mixture that includes ozone). It also includes an ozone-introducing component that the illustrated system 10 implements with a venturi injector 14 and static mixer 20 to introduce the ozonated air into the water to be treated to form what will be called ozonated water. In addition, they include a UV-treatment component 16 for treating the ozonated water with ultraviolet light.

The ozone-producing component 13 produces the ozonated air. It is a known type of component configured to produce ozonated air at a pressure and flow rate sufficient for overall system requirements. An air compressor may be used to produce pressurized air at 150 psi, for example, with the pressurized air being passed through an oxygen concentrator such as the Model 0229 oxygen concentrator available from Water Science Technologies of Scottsdale, Ariz. The output of the oxygen concentrator is then passed through a corona discharge or other suitable ozone generator, such as the Model G2 ozone generator available from PCI Ozone & Control Systems, Inc. of West Caldwell, N.J. That forms the ozonated air.

The ozonated air produced by the component 13 flows through an air tube 15 to the venturi injector 14. The venturi injector 14 may take any of various suitable forms, such as the Model 04-84-A available from Mazzei Injector Corp. of Bakersfield, Calif. Water to be treated entering the inlet 11 passes through a pump 17 and a pipe 18 to the venturi injector 14, and the venturi injector 14 injects the ozonated air into the water.

Injected with ozonated air, the water to be treated passes from the venturi injector 14 through a pipe 19 to the static mixer 20. The static mixer 20 may take the form of the Model 80-10-6-2 in-line mixer available from Kofio Corp. of Cary, Ill. Its curved vanes counteract channeling and promote intimate mixing of ozonated air with the water to form the ozonated water.

From the static mixer 20, the ozonated water passes through a pipe 21 to an upstream port 26 into the UV-treating component 16. The illustrated UV-treating component 16 takes the form of a specially shaped tank that constitutes the reaction chamber in which UV treatment is accomplished.

Attached to port 26 is a static impinger 27. The static impinger 27 functions to form the ozonated water into a fine mist of one micron droplets (i.e., droplets having one micron diameters). Sometimes referred to as a pig tail nozzle, it may take the form of the nozzle sold as Part No. TF-32-WW 316 under the trademark BETE FOG NOZZLE that is available from Bete Fog Nozzle, Inc. of Greenfield, Mass. Employed in the syrup industry for spraying viscous fluid, the static impinger 27 includes a tube that follows a spiralled path of decreasing diameter to a downwardly facing orifice.

Ozonated water passing through the static impinger 27 is expelled through the orifice in a fine, conically shaped mist. Particulate matter passes without causing blockage. In order to avoid waste space and facilitate the smooth downward movement of the water droplets, the chamber 16 has a conical roof 22 of the same angle 23 as the spray cone so as to form a solid boundary for the spray.

The chamber 16 captures ozonated air escaping from the ozonated water as the fine mist is formed. A vent line 28 in roof 22 vents the air through an ozone scrubber 29 to a vent 30, preferably venting to the atmosphere to maintain the pressure within the chamber 16 at close to atmospheric pressure. Doing so relieves the hazard concerns accompanying pressurized processes. It also enhances operation of the static impinger 27 because it makes use of the entire remaining gauge pressure for spraying.

The ozone scrubber 29 functions to reduce the amount of ozone present before passing the ozonated air to the vent 30. It may take the form of an air desiccant filter obtained from Comco, Inc. of Burbank, Calif. that is filled with the material sold under the trademark CARULITE by Carus Chemical Corp. of La Salle, Ill.

A UV light source 25 within the chamber 16 produces a UV light reactive zone in a lower region of the chamber traversed by the descending mist droplets arising out of spray cone 23, but above the water level 24 of the treated water pool 12 at the bottom 39 of chamber 16.

Water droplets passing through the zone defined by UV source 25 are treated by the UV light emitted by source 25. As previously stated, the UV light acts directly to kill bacteria and viruses and to oxidize undesirable compounds in the raw water droplets. Also, it serves as a catalyst for the disinfecting and oxidizing action of the ozone still part of the droplets.

Figure 2:
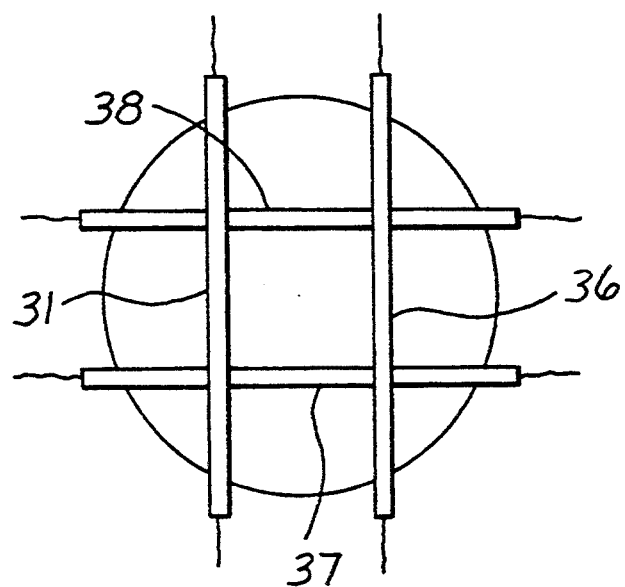
FIG. 2 is a cross-sectional view taken on line 2—2 of FIG. 1.

The UV light 25 is located in a horizontal plane through which the droplets are falling and it provides for uniform illumination of the chamber cross-section. It can be made up of tubular lamps arranged in the shape of a grid. As an example, FIG. 1 and the cross-sectional view in FIG. 2 show a square grid of four essentially co-planar tubular lamps 31, 36, 37, and 38. When the chamber cross-section is large, a multiplicity of tubular lamps is required, and the grid geometry can vary.

Various known UV components are available, such as a group of Model S50 UV light assemblies sold under the trademark SANITRON that is available from Atlantic Ultra Violet of Bay Shore, N.Y. They may include lamps one foot (30.5 cm), two foot (61 cm), and three foot (91.5 cm) in length mounted in protective quartz sleeves to insulate them from the water in chamber 16, and be powered by suitable known techniques.

The reacted droplets fall to the curved bottom 39 of chamber 16 to form a pool of treated water 12 defined by water level 24. The bottom curvature aids in draining all liquid from the chamber and in keeping any particulates in suspension. The treated water discharges through a downstream port 32, a pump 33, and filters 34 and 35 to the outlet 40. The filters may be provided with suitable valving to enable either one to be removed for cleaning and replacement purposes while the system 10 continues to operate.

Figure 3:
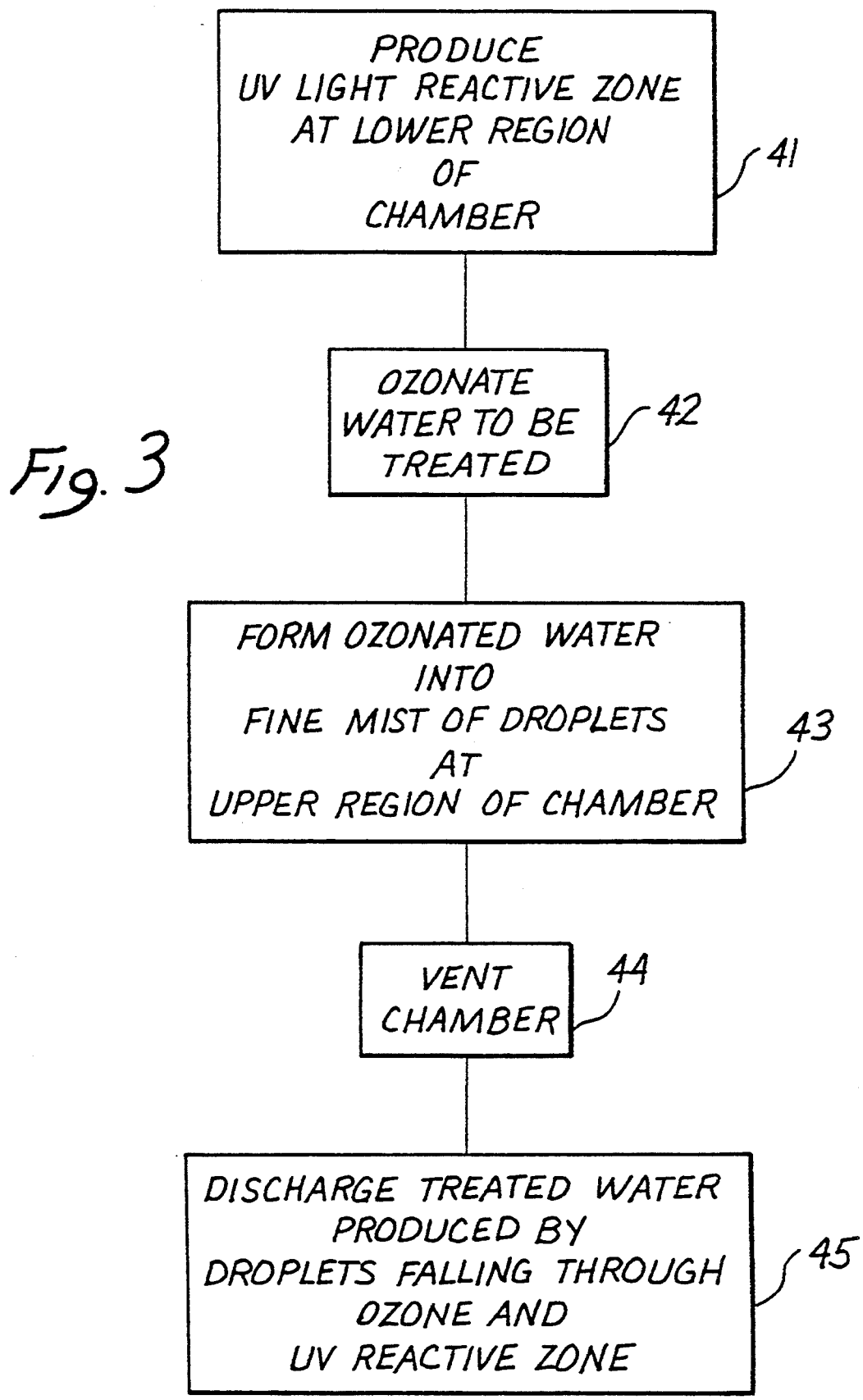
FIG. 3 is a flow chart of a method for treating water with ozone and UV light according to the invention.

FIG. 3 recapitulates the methodology. The method begins by producing an ultraviolet light reactive zone at a lower region of a closed chamber as stated at block 41. It proceeds by producing ozonated air and introducing the ozonated air into water to be treated to produce ozonated water (block 42). Next, the ozonated water is formed into a fine mist of droplets at an upper region of the closed chamber (block 43) while venting ozonated air escaping from the ozonated water into the chamber in order to maintain ozonated air in the chamber at a desired pressure (block 44). Then, treated water is discharged as it is produced by the droplets passing downwardly through ozonated air in the chamber and the ultraviolet light reactive zone (block 45).

When the invention is practiced with the design criteria and process parameters stated elsewhere in this patent application, a very favorable residence time of two minutes (water flowing through the reaction chamber 16) is achieved. The reactions take place at essentially atmospheric pressure so that potential hazards of a highly pressurized reactive chamber are avoided. The system for treating wastewater in the manner described may be implemented with commercially available components.

Although an exemplary embodiment has been shown and described, one of ordinary skill in the art may make many changes, modifications, and substitutions without necessarily departing from the spirit and scope of the invention.

What is claimed is:

1. A method for treating, purifying, and disinfecting a water stream containing impurities by the use of ozone and ultraviolet light, comprising the steps of:
   pressurizing the water stream;
   producing a pressurized ozonated air stream;
   mixing the water stream and the ozonated air stream to form a pressurized ozonated water stream in which the ozone starts to react with the impurities in the water;
   introducing the pressurized ozonated water stream in the form of a conically shaped fine mist of droplets having a diameter of about one micron into a closed reaction chamber having a conically shaped roof with a residence time of said water stream as it flows through said chamber of approximately two minutes;
   causing the fine mist of droplets to fall under gravity in said chamber with concomitant escape of reacted ozonated air from said droplets into said chamber;
   venting said escaping ozonated air from said chamber by venting means effecting a desired pressure level in said chamber;
   producing an ultraviolet light zone in a lower region of said chamber to react directly with impurities in said droplets and catalyze the ongoing action of ozone on said droplets;
   collecting said droplets after passing through the ultraviolet light zone into a pool of treated water at the bottom of said chamber; and
   discharging the treated water from the bottom of said chamber through filter means.

2. The method of claim 1, wherein the step of pressurizing the water stream includes pressurizing to a pressure in the range from 30 to 160 psig.

3. The method of claim 1, wherein the step of producing a pressurized ozonated air stream includes producing said stream at a pressure in the range from 15 to 25 psig.

4. The method of claim 1, wherein the step of mixing the water stream and ozonated air stream includes initial mixing in a venturi injector designed for a mixture of one volume of ozonated air with twenty volumes of water, and passing the pressurized ozonated water stream through an in-line mixer.

5. The method of claim 1, wherein the step of venting ozonated air from the chamber by venting means effecting a desired pressure level in said chamber includes a pressure level in the range from zero to five psig.

6. The method of claim 1, wherein the step of producing an ultraviolet light zone in the lower region of the chamber includes a horizontal light zone providing uniform illumination.

7. The method of claim 1, wherein the step of collecting droplets into a pool of treated water at the bottom of said chamber includes a curved chamber bottom to keep any particulates suspended in the water and facilitate draining.

* * * * *